United States Patent

[11] 3,545,790

| [72] | Inventors | Glenn G. Davis;<br>Robert W. Dahlin, Palm Springs, California |
|---|---|---|
| [21] | Appl. No. | 714,308 |
| [22] | Filed | March 19, 1968 |
| [45] | Patented | Dec. 8, 1970 |
| [73] | Assignee | Morris Lavine<br>Los Angeles, California<br>a part interest |

[54] DRAG CHUTE FOR LAND VEHICLES
11 Claims, 3 Drawing Figs.

[52] U.S. Cl. .................................................. 280/289, 188/1
[51] Int. Cl. ..................................................... B62j 27/00
[50] Field of Search ........................................... 280/289; 46/86, 223; 244/228, 113, 110; 180/1(.15); 296/1(S); D90/8; 188/1

[56] References Cited
UNITED STATES PATENTS

| 1,419,419 | 6/1922 | Snow ............................ | 244/110X |
| 2,126,589 | 8/1938 | Turner .......................... | 180/1UX |
| 2,363,732 | 11/1944 | Jenkins ......................... | 244/113 |
| 2,593,785 | 4/1952 | Nye et al. ...................... | 180/1UX |
| 3,158,343 | 11/1964 | Cotton .......................... | 244/110 |
| 3,380,756 | 4/1968 | Poynter ......................... | 280/289 |
| D132,520 | 5/1942 | Tomasini ....................... | 90/8 |
| D175,346 | 8/1955 | Kalt .............................. | 90/8 |
| 578,411 | 3/1897 | Lotherington ................. | 280/213 |
| 3,370,378 | 2/1968 | Simonini ....................... | 46/228 |

*Primary Examiner*—Kenneth H. Betts
*Attorney*—A. Donald Stolzy

ABSTRACT: The invention includes a device for tethering a parachute to the rear of a bicycle. The device is releasable and adapted to hold the parachute in folds and then to throw the parachute up into the air when released. An airfoil is also provided to keep the parachute in a stable position when it is filled with air.

PATENTED DEC 8 1970

INVENTORS.
GLENN GARY DAVIS
ROBERT WALTON DAHLIN
BY
*A. Donald Stizz*
ATTORNEY

PATENTED DEC 8 1970

INVENTORS.
GLENN GARY DAVIS
ROBERT WALTON DAHLIN
BY

ATTORNEY

3,545,790

DRAG CHUTE FOR LAND VEHICLES

BACKGROUND OF THE INVENTION

This invention relates to colorful plain parachutes or parachutes with national flags and other designs for slowing down moving vehicles, particularly bicycles, motorbikes, motor vehicles, helicopters, airplanes and balloons, and more particularly to any apparatus for positioning a drag chute.

The device of the present invention may have uses either as a practical drag chute for any kind of vehicle on the ground or in the air or as sports equipment or as a toy, or the like, where appearance may be important or where the novelty in the working mechanism may attain popularity.

Although the device of the present invention will have a multitude of other uses and is not to be limited to those disclosed herein, the invention has been found to be especially well adapted to actuate a plain or colorful drag chute with a national emblem for a bicycle or motor vehicle.

In the past use of a proper drag chute for a bicycle, motorbike or motor vehicle has not been made.

SUMMARY OF THE INVENTION

In accordance with the device of the present invention, the above-described and other disadvantages of the prior art are overcome by providing a plain or colorful drag chute, particularly for a bicycle, motorbike or motor vehicle.

In accordance with the special feature of the invention, means are provided to hold the chute securely in a compact holding position. Means are also provided for releasing the chute and throwing it up into the air behind the bicycle, motorbike or motor vehicle.

A further feature of the invention includes an airfoil fixed to the chassis of a bicycle forward of the chute. The airfoil may thus be a substantially planar wing fixed relative to the bicycle chassis. If desired, the wing may have straight and parallel leading and trailing edges. The wing also may have a teardrop cross section uniform throughout its length.

Another important feature of the invention resides in the location of the wing in the airstream which fills the chute when the bicycle is in motion. The wing thus provided for stability of the chute in its inflated position behind the bicycle.

The above-described and other advantages of the present invention will be better understood when considered in connection with the accompanying drawings.

BRIEF DESCRIPTION OF THE DRAWINGS

In the drawings, which are to be regarded as merely illustrative.

DESCRIPTION OF THE PREFERRED EMBODIMENT

Figure 1:
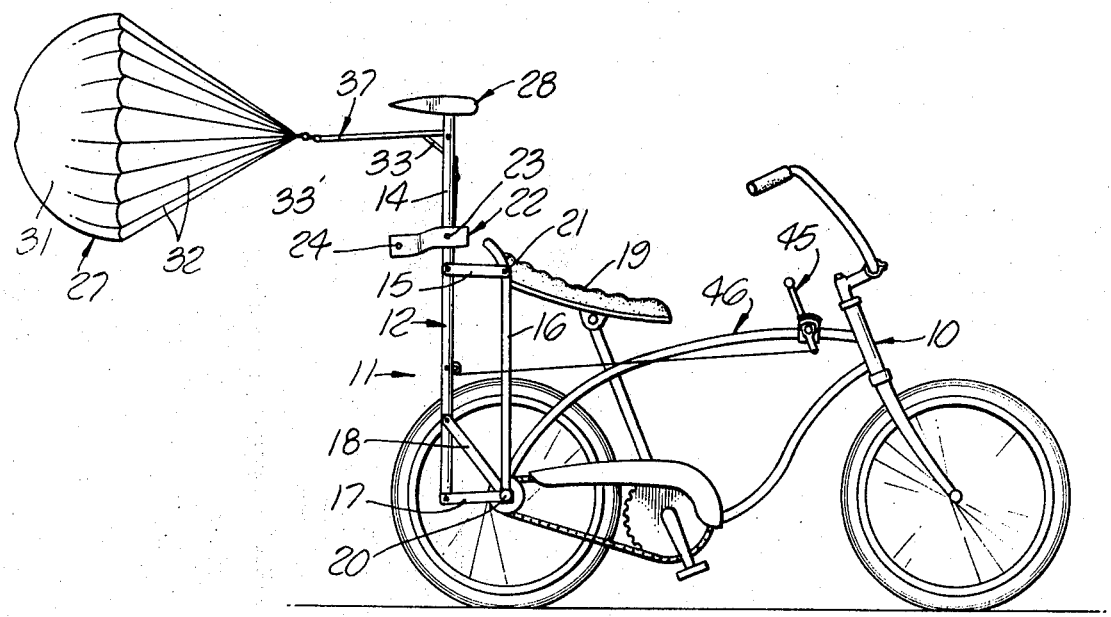
FIG. 1 is a side elevational view of a bicycle with the drag chute released and in its operative inflated position.

In the drawings, in FIG. 1 a bicycle 10 is indicated having an attachment 11. Bicycle 10 may be entirely conventional. Attachment 11 includes a frame 12 having two tubular vertical posts 13 and 14, one on each side of bicycle 10. Linkages 15, 16, 17 and 18 on each side of bicycle 10 hold posts 13 and 14 in a vertical position.

As shown in FIG. 1, bicycle 10 has a seat 19 and a rear axle 20. Linkages 15 and 16 are fixed to seat 19 by means 21. Means 21 may be any conventional fastening means. Linkages 16, 17 and 18 are fixed to axle 20 by any conventional means. Linkages 15, 17 and 18 are fixed to posts 13 and 14 by conventional means.

Attachment 11 has a strap 22 fixed to the outer surface of post 14 only by a rivet 23.

Figure 2:
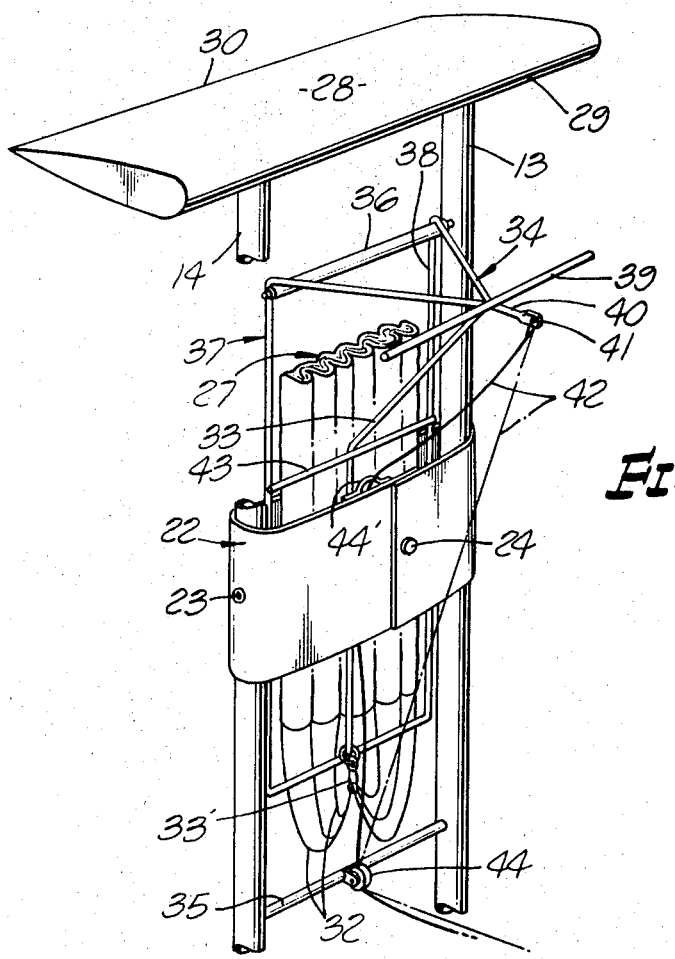
FIG. 2 is an enlarged perspective view of a bicycle attachment showing the drag chute in a collapsed position.

As shown in FIG. 2, strap 22 has overlapping ends which are fixed together with a conventional snap fastener 24. Snap fastener 24 has separate pieces 25 and 26 which snap apart to allow a parachute 27 to be released as shown in FIG. 3.

An airfoil or wing 28 is fixed to the top of posts 13 and 14 in the airstream which fills parachute 27. As shown in FIG. 2, wing 28 is substantially planar although it has some vertical thickness. Wing 28 has straight and parallel leading and trailing edges 29 and 30, respectively. The vertical cross section of wing 28 is teardrop in shape, and is uniform throughout the length of wing 28.

Figure 3:
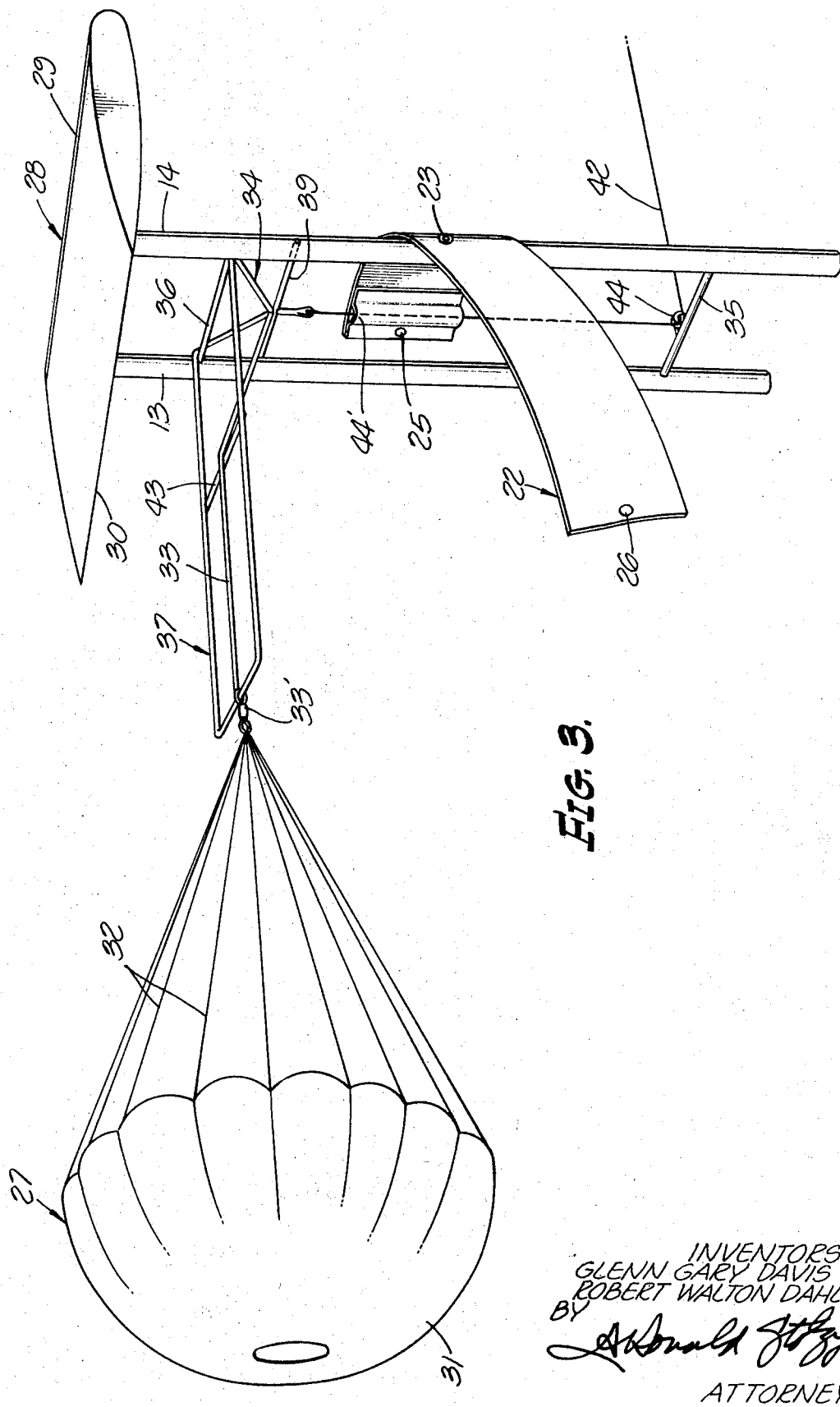
FIG. 3 is an enlarged perspective view of the attachment shown in FIG. 2 with the drag chute released.

Parachute 27 has a flexible body 31 to catch the air, shroud lines 32, and a tether or swivel 33' which is fixed to a subframe 37 shown in FIGS. 2 and 3. Parachute 27 may be entirely conventional.

A special structure constructed in accordance with the device of the present invention is provided to release and lift parachute 27 from its folded position shown in FIG. 2 so that it may trail bicycle 10, as shown in FIGS. 1 and 3. This construction includes a crossbar 35 fixed to posts 13 and 14 and a crossbar 36. Crossbar 36 extends through the tubes of posts 13 and 14. Crossbar 36 prevents posts 13 and 14 from spreading apart. Crossbar 36, however, is rotatable in the posts 13 and 14. The connection of crossbar 36 with posts 13 and 14 may be entirely conventional.

The releasing and elevating means includes subframe 37 which has a linkage 34 integral therewith. Subframe 37 includes a continuously bent rod 38 which forms a U and a brace rod 33. The ends of rod 38 are welded to a crossbar stop 39 where they are inclined toward each other in linkage 34 in a horizontal plane as shown in FIG. 2. Swivel 33' is tied to subframe 37 at the point where brace rod 33 is fixed to subframe 37. Subframe 37, linkage 34, and crossbar 39 may be all made of a welded steel construction. Rod 38 may be welded to cross bar 36. Linkage 34 has a steel appendage 40 welded thereto with an eye 41 at its outer end. A cable 42 is tied to appendage 43 at eye 41.

Note will be taken that crossbar 39 bears against posts 13 and 14 when subframe 37 is rotated ninety degrees, as shown in FIG. 3. Subframe 37 has a rod 43 which is welded across the U to brace rod 38 and to support parachute 27, as shown in FIG. 2.

Optionally, cable 42 extends through a guide 44' inside strap 22 and around a conventional sheave 44 fixed to crossbar 35 to a control 45 shown in FIG. 1. Note will be taken that bicycle 10 has a chassis 46 to which control 45 is fixed.

As shown in FIG. 2, when parachute 27 is collapsed and secured in its folded position to the rear of subframe 37, strap 22 holds parachute 27 and subframe 37 inside thereof. In this case the ends of strap 22 are held together by snap 24.

OPERATION

In the operation of the device of the present invention, cable 42 is pulled forwardly by operation of control 45. This opens snap 24 and pulls appendage 40 downwardly. Subframe 37 then rotates to the position shown in FIG. 3. Parachute 27 then fills with air when bicycle 10 is in forward motion and a rearward drag is placed upon such forward motion. At the same time wing 28 causes the airflow over and under it to stabilize the position of parachute 27 and improve its drag efficiency.

Notwithstanding the foregoing description of the preferred embodiment of the present invention, the invention is not to be limited to the specific structures shown and described. For example, cable 42 may, of course, be made of stranded or braided metal. Alternatively, cable 42 may be made of string, cord, a wire, or any other similar stranded, flexible connector. Still further, a different subframe operator may be provided which does not employ cable 42 or anything similar thereto.

If control 45 is used it may be a conventional bicycle gear shift control. It may hold subframe 37 in the position shown in FIG. 3. However, it need not hold subframe 37 in that position. Air filling parachute 27 will, of course, keep it aloft so long as bicycle 10 has a substantial forward motion. Any other conventional device may be substituted for control 45.

In accordance with the foregoing, it will be appreciated that the device of the present invention may be employed to provide a practical drag on the forward motion of bicycle 10. Alternatively, the device of the present invention may be employed as sporting equipment or as a toy where appearance may be important or where novelty in the working mechanism may attain popularity.

Although only one specific embodiment of the device of the present invention has been shown and described, it will be apparent to those skilled in the art that many other modifications of the invention may be made without departing from the true scope of the invention. The invention is therefore not to be limited to the construction thereof shown and described, the true scope of the invention being defined only in the appended claims.

We claim:

1. A bicycle or the like comprising: a chassis; at least one wheel rotatable on the ground about a horizontal axis; means to apply a torque to said wheel relative to said chassis to move said chassis over the ground; a parachute including a flexible body to catch air, and shroud lines each having one end connected around the body, the other end of said lines being tethered to said chasses; and an airfoil fixed to said chassis forward of said body.

2. The invention as defined in claim 1, wherein said airfoil lies in the airstream which fills said body when the vehicle is in motion.

3. The invention as defined in claim 2, wherein said airfoil is a wing.

4. The invention as defined in claim 3, wherein said wing is substantially horizontal and planar and extends transversely of the airstream.

5. The invention as defined in claim 4, wherein said wing has straight and parallel leading and trailing edges.

6. The invention as defined in claim 5, wherein said wing has a teardrop cross section uniform throughout its length.

7. A bicycle attachment or the like comprising: a parachute having shroud lines connected to a flexible body; support means for holding said parachute in a collapsed position on a bicycle; and tether means for fixing the said shroud lines to the bicycle, said support means including release means to allow said parachute to open and be filled with air during a ride, said support means including a frame adapted for fixed attachment to the chassis of a bicycle, said frame including two vertical posts for location to the rear of the bicycle in a transverse plane, said tether means including a subframe to carry the parachute on the rear or the top thereof, said subframe being pivoted to said frame about its upper end to swing about a horizontal axis in said transverse plane, said subframe being adapted to swing in a rearward direction from a position hanging downwardly to an approximately horizontal axis in said transverse plane, said subframe being adapted to swing in a rearward direction from a position hanging downwardly to an approximately horizontal position, a central linkage fixed to the upper end of said subframe extending horizontally forward therefrom when said subframe is in a vertical position, said release means including a cable control adapted to be fixed to the bicycle chassis forward of said support means, a sheave pivoted around a horizontal axis fixed to said frame in said transverse plane below the said pivot axis of said subframe and centrally between said posts, a strap extending around and fixed to only one of said posts in a position below the pivot axis of said subframe and above the lower end thereof, a cable having one end fixed to the cantilevered end of said linkage and extending inside said strap through a guide slot formed therein and extending around said sheave to a position forward thereof to said cable control, said strap having lapping ends fixed together by a detachable snap on the forward side of said posts to hold said parachute in a collapsed position on the rear of said subframe when it is hanging in a vertical position inside the fastened strap, said cable control being adapted to pull said cable forward to pivot said subframe to a horizontal position extending rearwardly of the bicycle, said subframe thereby opening said snap and lifting said parachute to be caught by the wind, said support means also including a wing fixed to the top of said posts in a position to lie in a horizontal line with the parachute when it is filled with air and trailing rearwardly of the bicycle, said wing extending transversely of the bicycle, said wing having a teardrop cross section uniform throughout its length.

8. A bicycle attachment or the like comprising: a parachute having shroud lines connected to a flexible body; support means for holding said parachute in a collapsed position on a bicycle; and tether means for fixing the said shroud lines to the bicycle, said support means including release means to allow said parachute to open and be filled with air during a ride, said support means including a frame, said release means including a pivoted subframe to release and throw the parachute up into the air.

9. The invention as defined in claim 8, wherein said release means includes control means to pivot said subframe from a position forward thereof.

10. The invention as defined in claim 9, wherein said release means includes a releasable harness to hold said parachute on said subframe.

11. The invention as defined in claim 8, wherein said release means includes a strap fixed to said frame in a position to extend around said subframe and the parachute when it is collapsed on said subframe, said strap having forward releasable means to allow said subframe to open the same as it rotates.